United States Patent

McMillan et al.

[15] 3,637,425

[45] Jan. 25, 1972

[54] AN INSULATING COATING ON SILICON

[72] Inventors: Peter William McMillan; Graham Partridge; Frank Russell Ward, all of Stafford, England

[73] Assignee: The English Electric Company Limited, London, England

[22] Filed: Nov. 17, 1967

[21] Appl. No.: 683,781

[30] Foreign Application Priority Data

Nov. 17, 1966 Great Britain ....................51,549/66
Nov. 2, 1967 Canada ....................4,092

[52] U.S. Cl. ....................117/125, 106/52, 106/54, 117/201, 117/221, 317/234 F, 317/235 E

[51] Int. Cl. ....................C03c 1/00, C03c 27/00

[58] Field of Search ....................117/201, 221, 125; 106/54, 106/52; 317/234, 235

[56] References Cited

UNITED STATES PATENTS

| | | | |
|---|---|---|---|
| 3,381,369 | 5/1968 | Stoller | 317/235 F |
| 3,392,312 | 7/1968 | Carman | 106/54 X |

FOREIGN PATENTS OR APPLICATIONS

| | | | |
|---|---|---|---|
| 103,734 | 8/1937 | Great Britain | 106/52 |
| 1,438,002 | 3/1966 | France | 106/52 |
| 1,506,436 | 11/1967 | France | 106/54 |

*Primary Examiner*—Alfred L. Leavitt
*Assistant Examiner*—C. K. Weiffenbach
*Attorney*—Misegades and Douglas, Keith Misegades and George R. Douglas, Jr.

[57] ABSTRACT

Silicon is bonded or coated with a glass-ceramic containing as major constituents ZnO, $Al_2O_3$, $SiO_2$ and either $B_2O_3$, BaO or CaO; alkali metals, Ge and Mg. are absent.

8 Claims, No Drawings

AN INSULATING COATING ON SILICON

This invention relates to articles comprising silicon having an insulating coating. The term insulating coating is to be taken to mean both a layer of insulating material over all or part of the surface of one or more silicon bodies, and a layer of insulating material by which a plurality of silicon bodies are bonded together or by which a silicon body is bonded to another body.

Silicon is used extensively for example in electronic applications, in which strips or chips of silicon are employed for example as transistors. Present-day electronic engineers are working intensively on the use of complementary pairs circuits comprising a pair of metal-oxide silicon transistors (MOST) for computer logic and storage devices. There are, however, serious technological difficulties associated with the manufacture of such pair circuits, in which two pieces of silicon (N-type and P-type respectively) have to be arranged together in a predetermined geometrical relationship. What is required is an insulating material which can be used to bond the pieces of silicon together and also to provide an insulating coating over the resulting unit.

The problems involved in choosing such a material, whether for bonding pieces of silicon together or merely for coating one or more pieces of silicon, include the following:

a. the insulating material must have a relatively high volume resistivity (preferably in excess of $10^8$ ohm-cm. at 500° C.), and b. it must be reasonably well matched to the silicon in thermal expansion characteristics, and c. it must be refractory to temperatures in the region of 1,000°-1,200° C., and d. it must be able to withstand the diffusion processes carried out at such temperatures, as required, in the fabrication of silicon semiconductor devices, and e. it must be capable of being applied satisfactorily to the silicon at a temperature substantially below the melting point of silicon, which is about 1,400° C.

The thermal expansion characteristics of the insulating material must be well enough matched to those of the silicon to ensure that the silicon shall not be strained or damaged by the coating, and also incidentally to ensure satisfactory adhesion: to these ends, the coefficient of linear thermal expansion of the insulating material should be within the range $(X-5)\times 10^{-7}$ to $(X+5)\times 10^{-7}$ per ° C., where $X\times 10^{-7}$ per C., is the coefficient of linear thermal expansion of the silicon. The value of X is in the approximate range 32-39 $\times 10^{-7}$ per° C. (20°-500° C.).

The requirement that the silicon should not be strained is important especially in connection with semiconductors, since excessive dislocations and "slip," by the coating into the silicon, renders the latter unsuitable for use as a semiconductor. In general, we believe that this requirement imposes a more stringent limitation on the permissible range of thermal expansion coefficient than does the requirement for good adhesion.

According to the present invention, in an article comprising silicon having an insulating coating, said coating is of a glass-ceramic containing, in proportions totaling at least 90 percent by weight of the total weight, $ZnO$, $Al_2O_3$, $SiO_2$ and a constituent selected from $B_2O_3$, $BaO$ and $CaO$, the alkali metals and germanium and magnesium being substantially absent from said glass-ceramic.

Preferably, said glass-ceramic contains approximately: 24-53 percent by weight $ZnO$, 9-20 percent by weight $Al_2O_3$, and 27-45 percent by weight $SiO_2$.

We have found that glass-ceramics having these compositions are suitable for use in coating silicon so as to satisfy the requirements (a) to (e) above. We are not aware of any other substance that is suitable for this purpose. Our experiments with articles according to the invention, and with glass-ceramics having compositions such that silicon coated therewith is an article within the scope of the invention, have shown that:

a. the volume resistivities of the said glass-ceramics are above $10^8$ ohm-cm. at 500° C.;

b. their coefficients of thermal expansion are in the approximate range 29-44$\times 10^{-7}$ per ° C. (20-500°C.);

c. they are refractory to temperatures in the range 1,000°-1,260° C.;

d. they withstand satisfactorily the diffusion processes used in fabricating silicon semiconductor devices; and e. they can readily be applied to the silicon in the form of a suspension, and fused thereon at temperatures not exceeding 1,300° C.

With regard to the thermal expansion characteristics, however, it is not sufficient that the coefficient of thermal expansion should be within the general range specified earlier: the expansion of the coating must match that of the silicon, within certain limits, over the whole range of temperatures to which the article is likely to be subjected. In other words, if over any part of such range the coating is likely to expand relative to the silicon by an amount sufficient to cause strain or damage of the silicon by the coating as discussed earlier, then the coating is not suitable. We have found this to be the case where germanium and magnesium were present in appreciable quantities in the coating: thus there should be substantially no germanium or magnesium present.

The invention is applicable to any article comprising silicon having an insulating coating as defined in the first paragraph hereof, and is not confined to pair circuits, or indeed to components for electronic circuitry.

Glass-ceramics which we have found suitable for use as insulating coatings for silicon include those having the following approximate ranges of major constituents, in percentages by weight: $ZnO$ 24-53 percent, $Al_2O_3$ 9-20 percent, and $SiO_2$ 27-45 percent. The $ZnO$, $Al_2O_3$ and $SiO_2$, together with a further major constituent, total at least 90 percent of the total weight. The said further major constituent is $B_2O_3$ or $BaO$ or $CaO$, the choice and proportion of which depends on the proportions of the other three major constituents.

Besides the major constituents, minor constituents and trace impurities may be present, up to 10 percent of the total weight. However, there should be substantially no $MgO$ and substantially no $GeO_2$ present. It is also important that the glass-ceramic should be substantially alkali-free.

More specifically, it is found that a glass-ceramic will satisfy the said requirements for coating silicon if it is included in any one of the following three groups:

Group A.

Glass-ceramics having $ZnO$, $Al_2O_3$, $SiO_2$ and $B_2O_3$ as major constituents totaling at least 90 percent of the total weight.

| | |
|---|---|
| $ZnO$ | 30-45% by weight approximately. |
| $Al_2O_3$ | 14-20% by weight approximately. |
| $SiO_2$ | 27-40% by weight approximately. |
| $B_2O_3$ | 5-16% by weight approximately. |

The following minor constituents may also be present:

| | |
|---|---|
| $ZrO_2$ | 0-5% by weight approximately. |
| $P_2O_5$ | 0-6% by weight approximately. |
| $CaO$ | 0-10%) by weight combined |
| $BaO$ | 0-10%) approximately. |

Group B.

Glass-ceramics having $ZnO$, $Al_2O_3$, $SiO_2$ and $BaO$ as major constituents totaling at least 90 percent of the total weight:

| | |
|---|---|
| $ZnO$ | 24-53% by weight approximately. |
| $Al_2O_3$ | 9-14% by weight approximately. |
| $SiO_2$ | 33-42% by weight approximately. |
| $BaO$ | 5-20% by weight approximately. |

The following minor constituents may also be present:

| | |
|---|---|
| $ZrO_2$ | 0-5% by weight approximately. |
| $P_2O_5$ | 0-6% by weight approximately. |
| $CaO$ | 0-5% by weight approximately. |
| $B_2O_3$ | 0-5% by weight approximately. |

Group C.

Glass-ceramics having ZnO, $Al_2O_3$, $SiO_2$ and CaO as major constituents totaling at least 90 percent of the total weight:

| | |
|---|---|
| ZnO | 29–35% by weight approximately. |
| $Al_2O_3$ | 12–16% by weight approximately. |
| $SiO_2$ | 40–45% by weight approximately. |
| CaO | 10–15% by weight approximately. |

The following minor constituents may also be present:

| | |
|---|---|
| $ZrO_2$ | 0–5% by weight approximately. |
| $P_2O_5$ | 0–6% by weight approximately. |
| BaO | 0–5% by weight approximately. |
| $B_2O_3$ | 0–5% by weight approximately. |

Suitable batch materials for making glass-ceramics in the above groups include the following, as appropriate: good quality glassmaking sand $SiO_2$; zinc oxide ZnO; aluminum oxide $Al_2O_3$ or hydroxide $Al(OH)_3$; Boric acid $H_3BO_3$; calcium carbonate $CaCO_3$; barium carbonate $BaCO_3$; zirconium dioxide $ZrO_2$ or silicate $ZrSiO_4$; metallic phosphate compatible with glass composition. Batch materials containing oxides of alkali metals, germanium or magnesium should not be used.

In a typical process for preparing the glass-ceramic, the batch materials are thoroughly mixed and are then melted, in crucibles having a high alumina content, to produce a molten glass. A batch melting temperature is chosen such that the glass obtained is batch and seed-free, and is in the range 1,400°–1,500° C. After refining, the glass is cast into cold water to form frit, which, after being washed and dried, is reduced to powder by milling for a suitable period, using for example flint pebbles or any other suitable means. The resulting glass powder is sufficiently fine to pass through a sieve having 200 holes per linear inch. The powder is made into a suspension, for example in methylated spirit. The suspension may if desired be made alkaline: or it may be acid or neutral. A silicon body to be coated is preoxidized by subjecting it to suitable heating in an oxidizing atmosphere, after which the glass powder suspension is applied to it by suitable means. The coated silicon body is heated in a furnace, under nonoxidizing and nonreducing conditions, to a fusion temperature the value of which depends on the composition of the glass. The heating rate should not exceed 5° C. per minute, and the fusion temperature is maintained for long enough to fuse the coating. It is found that when glasses having compositions in the broad groups A, B and C, given hereinbefore, are thus treated, the glass becomes devitrified during the heating process. The coated body is allowed to cool at a rate not exceeding 10° C. per minute.

In a more specific example of this process, samples of silicon are degreased and then preoxidized by heating for 1,200° C. for 3 hours in an atmosphere of wet argon. The batch materials are melted at the appropriate batch melting temperature and cast into cold water to form frit, which is then dried. Five-hundred grams of the dried frit are milled with 1,000 g. of flint pebbles having a nominal diameter of 1 inch (2.54 cm.), for 16 hours at 1,660 revolutions per hour in a mill jar having a diameter of 6 inches (15.2 cm.) and a capacity of half a gallon (2.27 liters). The resulting powder is passed through a sieve having 200 holes per inch (79 holes per cm.) and is then made into a suspension having the following quantities:

| | |
|---|---|
| Powder glass | 200 g. |
| Methylated spirit | 141 ml. |
| 10% ammonia solution ($NH_4OH$) | 9 ml. |

The suspension is applied to the preoxidized silicon using a known flow coating technique, and the coated silicon is then placed in a furnace in an atmosphere of high-purity argon and subjected to heat treatment as described above. The glass-ceramic coating on the silicon is found to be white, smooth and free from cracks and is adherent to the silicon.

In a typical process for bonding together two pieces of silicon, for example in the manufacture of an electronic device comprising a complementary pair of metal-oxide silicon transistors, the two pieces of silicon are powder coated, as described above, with a suspension containing a glass powder having a composition in one of the groups detailed hereinbefore. They are then assembled in a suitable jig and heated under a light load to the above-mentioned fusion temperature, which is maintained for a period long enough to fuse and devitrify the glass powder so that, after cooling, the pieces of silicon are firmly bonded together by the resulting glass-ceramic. A typical time for which this temperature must be maintained is 5 minutes.

Fourteen specific examples will now be given, of the compositions of glass-ceramic suitable for making coatings on silicon, and of appropriate temperatures for use in the processes described above.

The said specific examples are set out in the following table which specifies in each case the compositions of the glass-ceramic (in percentages by weight), a preferred melting temperature for the initial batch materials, the fusion temperature for the powder glass coating to produce fusion and devitrification thereof, the expansion coefficient of the glass-ceramic, and two values for the "refractoriness," i.e., the nominal maximum temperature which can be withstood by the glass-ceramic coated silicon article, for up to 1 hour (short-term) and for over 10 hours (long-term) respectively.

| Example | A1 | A2 | A3 | A4 | A5 | A6 | A7 | B1 | B2 | B3 | B4 | B5 | B6 | C1 | C2 |
|---|---|---|---|---|---|---|---|---|---|---|---|---|---|---|---|
| ZnO | 44.7 | 30.0 | 40.0 | 35.0 | 36.0 | 33.0 | 35.0 | 37.3 | 34.7 | 29.7 | 24.7 | 52.3 | 47.3 | 34.7 | 29.7 |
| $Al_2O_3$ | 14.0 | 20.0 | 16.0 | 20.0 | 17.0 | 20.0 | 20.0 | 13.3 | 14.0 | 14.0 | 14.0 | 9.0 | 9.0 | 14.0 | 14.0 |
| $SiO_2$ | 31.3 | 40.0 | 34.0 | 30.0 | 27.0 | 40.0 | 40.0 | 39.3 | 41.3 | 41.3 | 41.3 | 33.7 | 38.7 | 41.3 | 41.3 |
| $B_2O_3$ | 10.0 | 10.0 | 10.0 | 15.0 | 16.0 | 7.0 | 5.0 | | | | | | | | |
| BaO | | | | | | | | 10.1 | 10.0 | 15.0 | 20.0 | 5.0 | 5.0 | | |
| CaO | | | | | | | | | | | | | | 10.0 | 15.0 |
| $ZrO_2$ | | | | | 4.0 | | | | | | | | | | |
| Batch melting temp. (° C.) | 1,400 | 1,500 | 1,450 | 1,400 | 1,400 | 1,450 | 1,450 | 1,500 | 1,500 | 1,500 | 1,500 | 1,450 | 1,450 | 1,500 | 1,500 |
| Fusion temp. (° C.) | 1,080 | 1,220 | 1,180 | 1,180 | 1,170 | 1,260 | 1,260 | 1,230 | 1,240 | 1,200 | 1,220 | 1,300 | 1,280 | 1,170 | 1,140 |
| Expansion coefficient×10 (per ° C., 20–500° C.) | 40.8 | 43.4 | 36.6 | 31.7 | 36.9 | 41.6 | 33.2 | 32.5 | 41.3 | 38.7 | 37.7 | 29.2 | 36.4 | 31.5 | 38.5 |
| Refractoriness (° C.): | | | | | | | | | | | | | | | |
| Short-term | 1,050 | 1,200 | 1,150 | 1,150 | 1,130 | 1,230 | 1,240 | 1,200 | 1,200 | 1,180 | 1,200 | 1,260 | 1,260 | 1,150 | 1,100 |
| Long-term | 1,000 | 1,100 | 1,080 | 1,080 | 1,070 | 1,150 | 1,150 | 1,100 | 1,150 | 1,120 | 1,150 | 1,200 | 1,200 | 1,100 | 1,050 |

We claim:

1. An article comprising a silicon body having a thermally matched insulating coating of a glass-ceramic consisting essentially of, by weight,

| | |
|---|---|
| ZnO | 24–53% |
| $Al_2O_3$ | 9–20% |
| $SiO_2$ | 27–45% |
| $B_2O_3$ ) | |
| BaO ) | 5–20% together. |
| CaO ) | |

2. An article according to claim 1 comprising a complementary pair of metal-oxide silicon transistors bonded together by the glass-ceramic coating.

3. An article according to claim 1, wherein the glass-ceramic consists essentially of, by weight,

| | |
|---|---|
| ZnO | 30–45% |
| $Al_2O_3$ | 14–20% |
| $SiO_2$ | 27–40% |
| $B_2O_3$ | 5–16%. |

4. An article according to claim 3, wherein the glass-ceramic also contains, by weight,

| | |
|---|---|
| $ZrO_2$ | 0–5% |
| $P_2O_5$ | 0–6% |
| CaO | 0–10% |
| BaO | 0–10%, |

these substances totaling less than 10 percent.

5. An article according to claim 1, wherein the glass-ceramic consists essentially, of, by weight,

| | |
|---|---|
| ZnO | 24–53% |
| $Al_2O_3$ | 9–14% |
| $SiO_2$ | 33–42% |
| BaO | 5–20%. |

6. An article according to claim 5, wherein the glass-ceramic also contains, by weight,

| | |
|---|---|
| $ZrO_2$ | 0–5% |
| $P_2O_5$ | 0–6% |
| CaO | 0–10% |
| $B_2O_3$ | 0–5% |

these substances totaling less than 10 percent.

7. An article according to claim 1, wherein the glass-ceramic consists essentially of, by weight,

| | |
|---|---|
| ZnO | 29–35% |
| $Al_2O_3$ | 12–16% |
| $SiO_2$ | 40–45% |
| CaO | 10–15% |

8. An article according to claim 7, wherein the glass-ceramic also contains, by weight,

| | |
|---|---|
| $ZrO_2$ | 0–5% |
| $P_2O_5$ | 0–6% |
| BaO | 0–5% |
| $B_2O_3$ | 0–5% |

these substances totaling less than 10 percent.

* * * * *